INVENTOR.
George M. Naul.
BY
William R. Nolte
AGENT

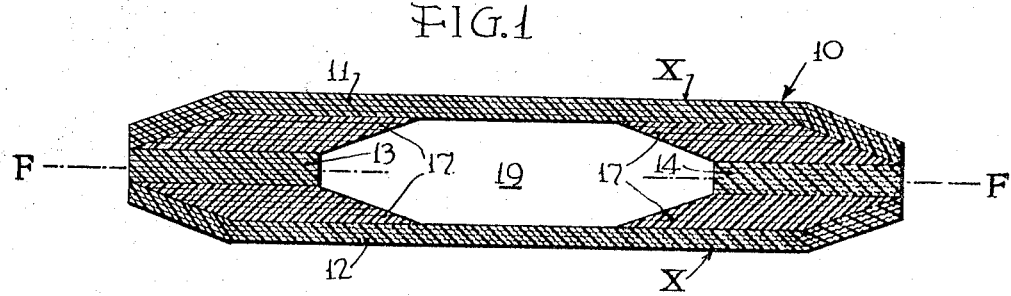
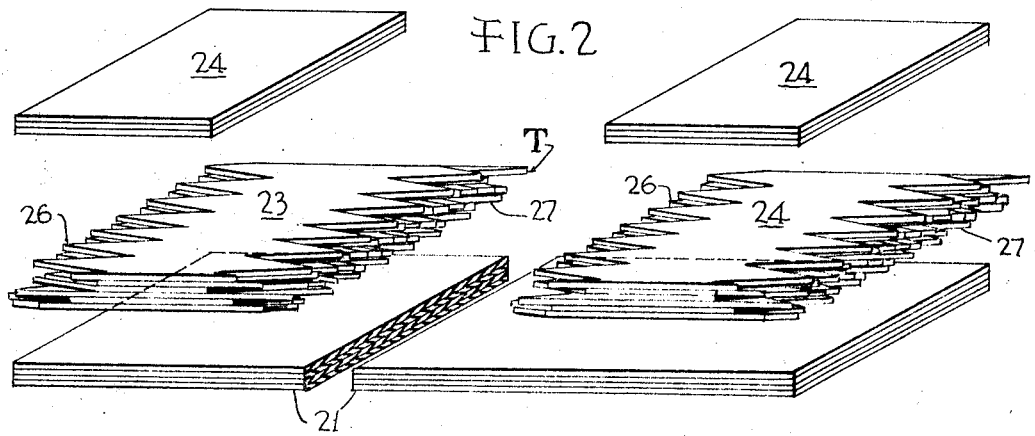
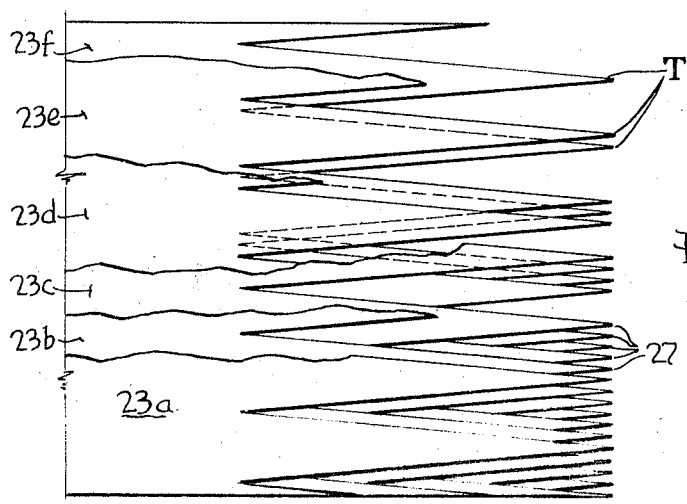

United States Patent Office 3,425,463
Patented Feb. 4, 1969

3,425,463
LAMINATED SHUTTLE
George M. Naul, Newcastle, Del., assignor to The Budd Company, Philadelphia, Pa., a corporation of Pennsylvania
Filed July 21, 1967, Ser. No. 655,206
U.S. Cl. 139—196    4 Claims
Int. Cl. D03j 5/00, 5/02

ABSTRACT OF THE DISCLOSURE

A laminated shuttle body structure having tapered portions, interposed between its side wall and end wall portions. The tapered portions are formed of laminated sheets of material having gores cut along opposed edges which are of a length equal to that of the desired taper.

---

The object of this invention is to provide a laminated loom shuttle body as a substitute for wooden shuttles which have been used in the industry for a great number of years, and which possess inherent disadvantages in their use. Because of the nonuniformity of wood, it tends to split or crack in service resulting in breaks or damage to the threads and yarn being used. In addition, the splintering and cracking of the wood may cause injury to the operators. A further disadvantage of wooden construction of shuttles is their high cost of production. Due to grain alignment and other inherent imperfections in wood there is a large waste in raw blanks which does not become apparent until a part, or all of the machining has been accomplished on the blank. These disadvantages coupled with their very short operating life, and high expense constitute objections overcome by the improved construction hereinafter described and claimed.

It is therefore another object of this invention to provide an improved shuttle body construction which avoids one or more of the disadvantages of the prior art arrangements and which has prolonged operating life.

Another object of this invention is to provide a molded laminated shuttle body comprising a combination of reinforcing materials which together with suitable binding materials will produce a structure capable of being employed in looms for prolonged periods.

For a better understanding of the invention, reference may be had to the accompanying drawing in which:

FIG. 1 is a longitudinal cross sectional view of a molded shuttle blank made in accordance with the present invention;

FIG. 2 is an exploded view showing cut sheets and their relative longitudinal positions of the lower half of the shuttle shown in FIG. 1 prior to their being molded;

FIG. 3 is a plan view taken along the line 3—3 of FIG. 4 showing the die cut ends of successive laminates one on top of another;

Figure 4:
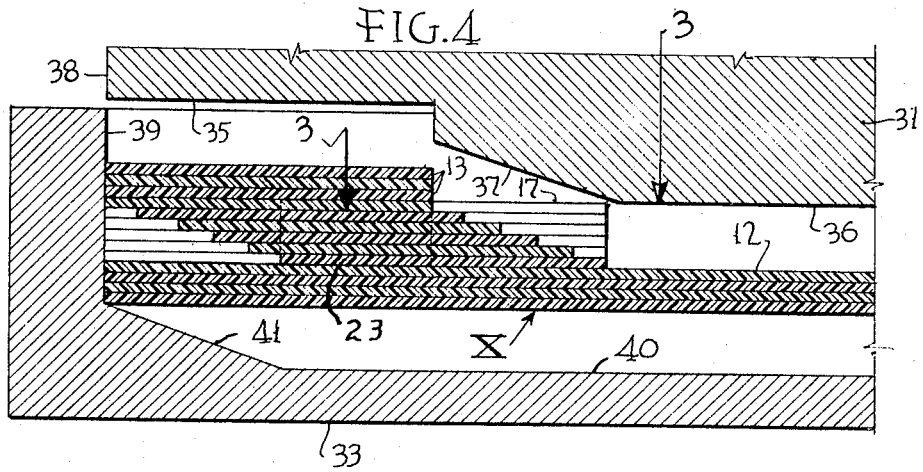
FIG. 4 is a sectional elevational view showing the stacked sheets of FIG. 3 placed in a preform mold.

The shuttle blanks of the present invention may be molded from layers of material such as resin impregnated cotton fabric. These shuttles are believed to be superior to previously used wooden shuttles and have a considerably longer service life and require considerably less maintenance. A resin solution suitable for the impregnating process would be a single step phenol-formaldehyde resin diluted with a solvent such as methanol. The properties of a typical resin would be:

Resin solids, percent _____ 57–62
Viscosity, centipoises _____ 130–200
Hot plate set-time (sec. @ 105° C.) _____ 60–85
Specific gravity _____ 1.055–1.066

The normal method of impregnating the cotton fabric consists of feeding the web of the roll of fabric through an open tank of the resin solution, then leading the same through metering rolls which squeeze out the excess pick-up of fluid. The web is then conveyed through a horizontal steam heated multizoned oven. Oven temperatures range from 250° F. to 350° F. During the period of time exposed to the elevated temperatures, the solvent is evaporated, and the resin is advanced to the B-stage. The web is then rewound into a roll after cooling.

Resin content of the impregnated fabric is in the range of 43–53% by weight. The degree of advancement of the resin may be measured by the amount which may dissolve or leach out by immersion in a suitable solvent. With acetone, a suitable range of acetone solubility is 30–40%.

Referring now to FIG. 1 of the drawing there is illustrated a molded shuttle blank 10 consisting of resin impregnated laminations of cotton fabric prepared in accordance with this invention. The blank 10 is shown comprised of two identical half parts or sections X, X, joined along the longitudinal centerline F—F of the blank. The blank in its assembled form includes laminated side wall portions 11, 12, end wall portions 13, 14 and double tapered portions 17 interposed between the side and end portions. The side, end, and double tapered portions when assembled together in the manner as illustrated, define a central elongated opening or chamber 19 within the shuttle body 10.

With reference now to FIG. 2, it is seen that each half part of section X includes a buildup of a plurality of layers or blanks of resin impregnated elongated rectangular sheet fabric 21. In addition, a plurality of blanks of material 23, 24 are stacked at opposite ends of the blanks 21. Each sheet or blank 23 is of shorter length than side sheet 21 and includes opposed serrated edges 26, 27. The length of each blank 24 is also less than the distance between the outer extremities of opposed serrated edges 26, 27 of each sheet 23.

As seen in FIG. 3 a plurality of blanks 23a–23f inclusive are stacked one upon another. The tongues T of each of the blanks may be of any desired configuration but in the present instance are shown to be of triangular form. The tongues T moreover of the topmost blank 23a are offset or staggered relative to the tongues T of the next adjacent layer 23b therebeneath. In a similar manner the tongues T of blank 23b are offset relative to tongues T of blank 23c below it. With the buildup of the stack in this fashion the tongues T of one layer are disposed partially opposite a gap portion formed between spaced tongues of the layer or blank below.

After building up the several groups of cut blanks 21, 23 and 24 of resin treated fabric as above described, the blanks may then be consolidated for ease of handling and more rapid molding, by introducing the stacked blanks to a field of a radio frequency generator. This enables rapid heating of the plastic materials employed by means of internal electrical loss. The buildup of the sheets so assembled may rapidly attain a surface temperature of 110° C. Thereafter, the buildup of the groups of blanks is transferred to a suitable cold preforming mold, FIG. 4, of steel consisting of an upper male die 31 and a lower female die 33 and subjected to a unit pressure of approximately 500 p.s.i. to consolidate the successive layers of material. This preforming operation of the half blank sections requires that the layers of fabric placed in the mold to be under pressure for approximately 0.5 minute to cool the surface of the half shuttle preform X. The upper male die 31 includes vertically offset horizontal planes 35 outer, 36 inner, which are interconnected by an inclined plane 37 and bounded by outer vertical sides 38. The female die 33 includes corresponding vertical walls 39, a central horizontal plane surface 40, and interconnecting inclined planes 41, joining walls 39 to central plane 40.

Figure 5:
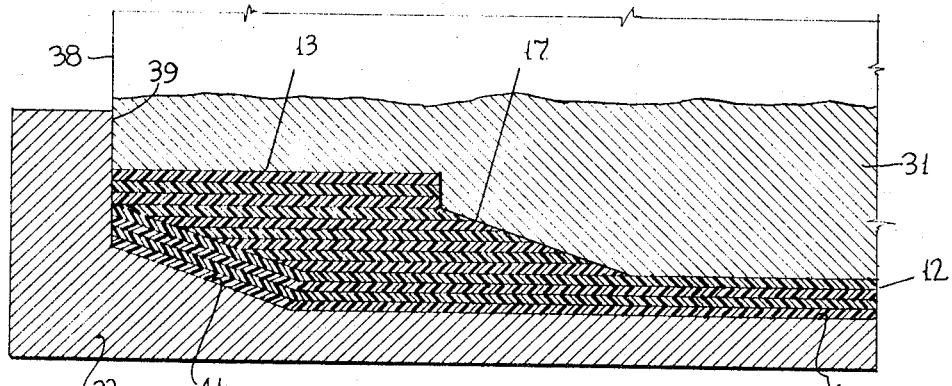
FIG. 5 is a sectional view showing the sheets of FIG. 4 after the same have been compressed in molding.
Figure 6:
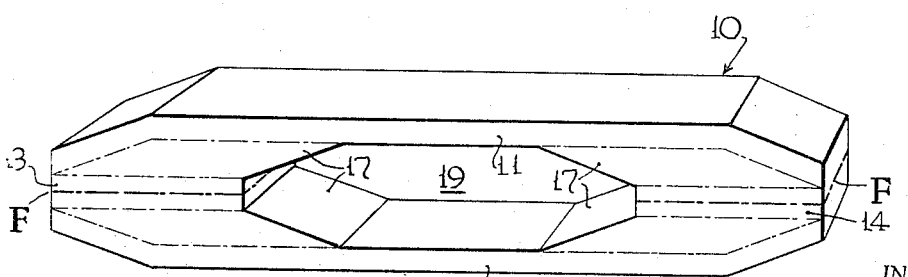
FIG. 6 is an isometric view showing the molded form of groups of sheets shown in FIG. 2 after the same have been molded together to form a finished shuttle blank.

With reference to FIG. 5 it is seen that the tongues T of each blank 23 and deflected as a result of the preforming operation so as to partially lie in a plane containing the tongues T of an adjacent layer. Thus as seen in FIG. 4, the stack of sheets 23 as viewed in elevation is wedged or tapered at each of its ends, in that the tongues of the buildup layers are staggered in a fashion to "average" the resulting reduction in area when considered in a plane normal to the stack. In cross section the entire stack of sheets 23 in exterior outline define a trapezoid.

A pair of half shuttle blanks X, X may thereafter be joined as indicated in FIG. 1 along the line A—A thereof. For this purpose the two preform halves may be loaded into a suitable flash-type mold with a suitable mandrel to maintain the elongated central chamber indicated as at 19. Both the mold and the mandrel are heated to 150°–165° C. The unit pressure on the impregnated fabric layers therebetween should be in the range of 1800 to 2200 p.s.i. A typical shuttle form of approximately two inch maximum section requires approximately 50–60 minutes to completely cure the resin to an infusible shape. Because of the mass of material involved however, it is necessary to cool the molded part under pressure in the mold until the surface temperature has been reduced to approximately 120° C.

While there have been described what at present is considered to be the preferred embodiment of this invention, it will be obvious to those skilled in the art that various changes and modifications may be made therein without departing from the invention and it is therefore aimed in the appended claims to cover all such changes and modifications as fall within the true spirit and scope of the invention. Particularly it should be noted that the tapered end portions on each individual laminate makes it possible to obtain better bonding between the individual laminates of the stack. This is made possible by the resin being able to penetrate into the laminate layers at their fingered edges. This improved bonding would not be present in the absence of such fingers for example, if the ends of the laminates were merely fanned. It should also be appreciated that in the above arrangement that the tongues of each laminate are deflected so as to lie in a plane or planes of adjacent laminates thereby providing and interlocking relationship between adjacent laminates which form the double tapered end portions of the stacks utilized in the shuttle.

What is claimed is:
1. A molded shuttle body having a longitudinal axis and comprising in combination, a pair of opposed side wall portions with end wall portions therebetween, tapered portions received between said side wall portions and said end wall portions, said side wall, end wall and tapered portions defining an elongated chamber, said tapered portions including a plurality of layers of resin impregnated fabric, each layer having serrations along one of its edges and lying in planes intersecting said longitudinal axis, the serrations of one layer being offset laterally with respect to those serrations of a next adjacent layer.

2. In the molded shuttle body construction as set forth in claim 1 wherein each layer of said tapered portions include serrations along an edge opposed to said one of its edges thereof.

3. In the molded shuttle body construction as set forth in claim 2 wherein said serrations disposed along opposed edges consist of a plurality of tongues of triangular configuration with the tongues of one layer being laterally offset with the tongues of an adjacent layer.

4. In the molded shuttle body construction as set forth in claim 2 wherein said serrations along opposed edges of said plurality of layers of fabric consist of tongues spaced along said edges with the tongues of one layer being deflected from the plane of said one layer in a manner to lie partially in the plane containing tongues of an adjacent layer.

References Cited
UNITED STATES PATENTS
1,372,131   3/1921   Franklin _____ 139—196
2,905,208   9/1959   Goreau _____ 139—196
3,209,790   10/1965   Naul _____ 139—196

FOREIGN PATENTS
476,427   12/1952   Italy.

JAMES KEE CHI, *Primary Examiner.*